UNITED STATES PATENT OFFICE.

WILLIAM A. HALL, OF BELLOWS FALLS, VERMONT.

WATERPROOFING COMPOUND.

SPECIFICATION forming part of Reissued Letters Patent No. 11,811, dated March 6, 1900.

Original No. 609,200, dated August 16, 1898. Application for reissue filed November 17, 1899. Serial No. 737,373.

*To all whom it may concern:*

Be it known that I, WILLIAM A. HALL, a citizen of the United States, residing at Bellows Falls, in the county of Windham and State of Vermont, have invented certain new and useful Improvements in Waterproofing Compounds; and I do hereby declare the following to be a full, clear, and exact description of the invention, such as will enable others skilled in the art to which it appertains to make and use the same.

This invention relates to improvements in sizing compounds or insoluble coatings for papers, my object being to produce a sizing or coating for paper which shall possess the desirable quality of insolubility, but which at the same time will readily receive the inks or pigments and allow the oil or water vehicles of the dyes and printing compounds to strike through and get a good hold in the fabrics or surfaces to which it is applied, it being very desirable that these coatings be permeable and yet insoluble to give a good surface for chromolithography and similar work. This quality of the compound which I have invented renders it peculiarly adapted for surfacing the walls of rooms or of advertising-signs intended for outdoor service or of paper, cloth, leather, or analogous substances which it is desirable should receive an insoluble coating and one which is pervious to but unaffected by water and yet remains in such condition as to readily take the inks or pigments used in printing and decorative work.

My new composition as a commercial commodity consists, preferably, of about sixteen parts, by weight, of casein, one part alkali (preferably soda or borax) dissolved in water, one-half part of a forty-per-cent. solution of formaldehyde, ($CH_2O$,) and eighty parts of a mineral base consisting of some finely-comminuted, porous, or absorbent substance—clay, talc, or infusorial earth serving equally well for this purpose.

In the production of the composition I preferably first dissolve the casein in the alkaline solution and then add the mineral base, which should first be worked up in water, and to the mixture thus formed the formaldehyde is then added, the above-mentioned proportion of the formaldehyde being about three and one-half per cent. relative to the casein and the whole mixture being now in liquid form. The effect of the formaldehyde used in this casein composition is to render the same when fully dried out insoluble in or insensible to the action of water either at normal or at high temperatures. In fact, no perceptible effect is had on this casein coating after it has once been thoroughly dried when subjected to the action of a mildly-alkaline solution. The effect of using this earthy or mineral base as an element of the composition is to retard for a short time the setting of the composition, and thus preventing its reaching a perfectly-insoluble state, and it further retards the formaldehyde from precipitating the casein from its solution. By thus retarding the action of the composition it can be much more easily handled and its application as a coating becomes practicable and freed from many difficulties. A further advantage derived from the use of this porous mineral base is that the earthy element gives to paper coated with the composition a surface that takes ink very readily, for the reason that the pores of the paper do not become closed and obstructed, so as to prevent the absorption of the ink or printing fluid, as is the case when a shellac or wax coating is used to surface the paper.

While it is important that the compound described above become when dried out quite insoluble and capable of resisting the action of water, yet it is equally important that the coating composed of the elements above recited be prevented from too quickly setting and arriving at a state of complete insolubility. One of the reasons for this is that if the coating become immediately insoluble difficulties in the mechanical application of the compound in finishing papers, &c., would arise, such as the immediate hardening of the composition upon the brushes, implements, and machines by which it is applied to the articles treated. This alone would prevent the commercial success of the invention and interfere with the application of it to the purposes for which it is intended to a great extent.

The composition which I have described above may be made up and applied in a number of different ways in carrying my invention into effect without departing from the spirit thereof.

The liquid composition may be applied to the article to be coated in any desirable manner, and the color may be varied as desired by the addition of the proper pigments. The condition of insolubility hereinbefore referred to is not reached for some time after the application of the coating, this being partly due to the retarding action of the mineral base and partly to the fact that complete seasoning and consequent oxidation of the elements of the composition must take place before a perfect waterproof condition is reached.

Another method of applying the compound is to spread a coating of the casein solution, with or without the mineral base, upon the surface to be waterproofed and over the coating thus formed apply an aqueous solution of formaldehyde, the effect of such treatment being similar to that produced by the first-named method—viz., to produce a coating insoluble and resisting the attacks of moisture. I have also discovered that where a wall paint or liquid in which casein is used as a sizing is laid over the surface, allowed to dry out somewhat, and then treated with formaldehyde the results are equally good as those obtained when the several elements of the composition are mixed prior to their application to the surface to be coated.

In lieu of applying the formaldehyde, as above stated, in aqueous solution the mineral base—such as talc, clay, &c.—which possesses absorbent qualities, may be treated with the gas, ($CH_2O$.) These substances will absorb the gas in large quantities without becoming wet, and this mineral base so charged with gas can be added to the casein solution and produce similar and equally-good results as when the aqueous solution is used. By this union of the elements before described—an alkaline solution of casein, formaldehyde, ($CH_2O$,) and an earthy mineral base—an enamel or coating is produced which gives a superior finish to articles which are treated with the composition and one which while insoluble in water is yet sufficiently porous to leave the paper possessed of those absorbent qualities which are very essential for the reception and retention of writing, printing, or lithographing inks and pigments.

The uses to which the composition may be put are manifold. Wall-surfaces treated with it are protected from the attacking moisture, which is apt to render them unsightly and ruin them. Surfaces thus treated are, however, in as good receptive condition for decorative work as before, a condition which it is impossible to preserve with some of the shellac or waxy compositions now in use, these latter destroying the porosity and absorptive qualities of the surface. Leather, paper, and cloth when treated with this sizing are rendered quite waterproof and the fabrics protected from the attacks of moisture, while a highly-finished surface is given to them.

Having thus described my invention, I claim and desire to secure by Letters Patent—

1. A composition for giving an insoluble, porous coating to wall-surfaces, paper, &c., composed of a solution of casein, a retarding agent, to prevent too-rapid setting of the coating and to insure its porosity, and formaldehyde, ($CH_2O$.)

2. A composition for giving an insoluble, porous coating to wall-surfaces, paper, &c., composed of casein, an alkali, a retarding agent, to prevent too-rapid setting of the coating and to insure its porosity, and formaldehyde, ($CH_2O$.)

3. A composition for giving an insoluble, porous coating to wall-surfaces, paper, &c., composed of casein, an alkali, a mineral base, to act as a retarding agent and give porosity to the coating, and formaldehyde, ($CH_2O$.)

4. The method of producing an insoluble composition for coating wall-surfaces, paper, &c., which consists in dissolving casein in an alkali solution, adding a mineral substance to said solution to serve as a base and retarding agent and to give porosity to the coating, and then infusing formaldehyde ($CH_2O$) into the compound thus formed.

In testimony whereof I affix my signature in presence of two witnesses.

WILLIAM A. HALL.

Witnesses:

WILLIAM M. BROWNELL,
GERALD N. THAXTER.